United States Patent [19]
Oliver et al.

[11] Patent Number: 5,848,770
[45] Date of Patent: Dec. 15, 1998

[54] CLEVIS HANGER

[75] Inventors: Robert D. Oliver; Eric R. Rinderer, both of Highland, Ill.

[73] Assignee: Sigma-Aldrich Co., Highland, Ill.

[21] Appl. No.: 806,916

[22] Filed: Feb. 27, 1997

[51] Int. Cl.⁶ .................................................. E21F 17/02
[52] U.S. Cl. .............................................. 248/58; 248/62
[58] Field of Search ............................. 248/58, 62, 74.1, 248/65

[56] References Cited

U.S. PATENT DOCUMENTS

| | | | |
|---|---|---|---|
| 411,518 | 9/1889 | Collis | 248/62 X |
| 437,782 | 9/1890 | Cooke, Jr. | 248/62 |
| 1,477,621 | 12/1923 | Zifferer. | |
| 1,612,959 | 1/1927 | Zifferer. | |
| 1,870,651 | 8/1932 | Robinson et al. | |
| 2,339,564 | 1/1944 | Goldberg et al. | 248/62 |
| 2,671,625 | 3/1954 | Buckley | 248/58 |
| 2,714,497 | 8/1955 | Denis | 248/62 |
| 2,835,464 | 5/1958 | Kolodin | 248/62 |
| 3,051,424 | 8/1962 | Duhamel | 248/62 |
| 3,652,045 | 3/1972 | Hirt | 248/62 |
| 4,004,767 | 1/1977 | Chilton | 248/58 |
| 4,019,705 | 4/1977 | Habuda, Sr. et al. | 248/58 |
| 4,019,706 | 4/1977 | Weiland, Sr. | 248/58 X |
| 4,252,289 | 2/1981 | Herb | 248/62 |
| 4,765,577 | 8/1988 | Collins et al. | 248/59 |
| 4,767,087 | 8/1988 | Combu | 248/62 |
| 5,193,769 | 3/1993 | Hofle | 248/62 X |
| 5,219,427 | 6/1993 | Harris | 248/62 X |

FOREIGN PATENT DOCUMENTS 2504222  8/1976  Germany ................................. 248/62

OTHER PUBLICATIONS

"Pipe Hangers," B–Line Systems, Inc., undated, pp. 50 & 55, admitted prior art.

Primary Examiner—Derek J. Berger
Attorney, Agent, or Firm—Senniger, Powers, Leavitt & Roedel

[57] ABSTRACT

A clevis hanger for supporting conduit comprising a lower U-shaped member having a pair of generally parallel arms, each arm having an upper end, and an upper hanger member having a pair of spaced-apart arms depending generally downward therefrom. Each arm of the upper hanger member has an upper portion and a lower portion. The lower portions of are horizontally spaced apart such that the lower portions are located adjacent the arms of the lower hanger member. Each of the arms of the lower hanger member and each of the lower portions of the arms of the upper hanger member has an opening therein. The openings are in generally horizontal alignment with one another when the upper and lower hanger members are connected. An elongate fastener is adapted to be inserted through the aligned openings to connect the upper and lower hanger members. The clevis hanger further includes an alignment member for limiting the upward movement of the lower hanger member relative to the upper hanger member to align the openings in the arms of the upper and lower hanger members to facilitate insertion of the fastener through the openings.

29 Claims, 6 Drawing Sheets

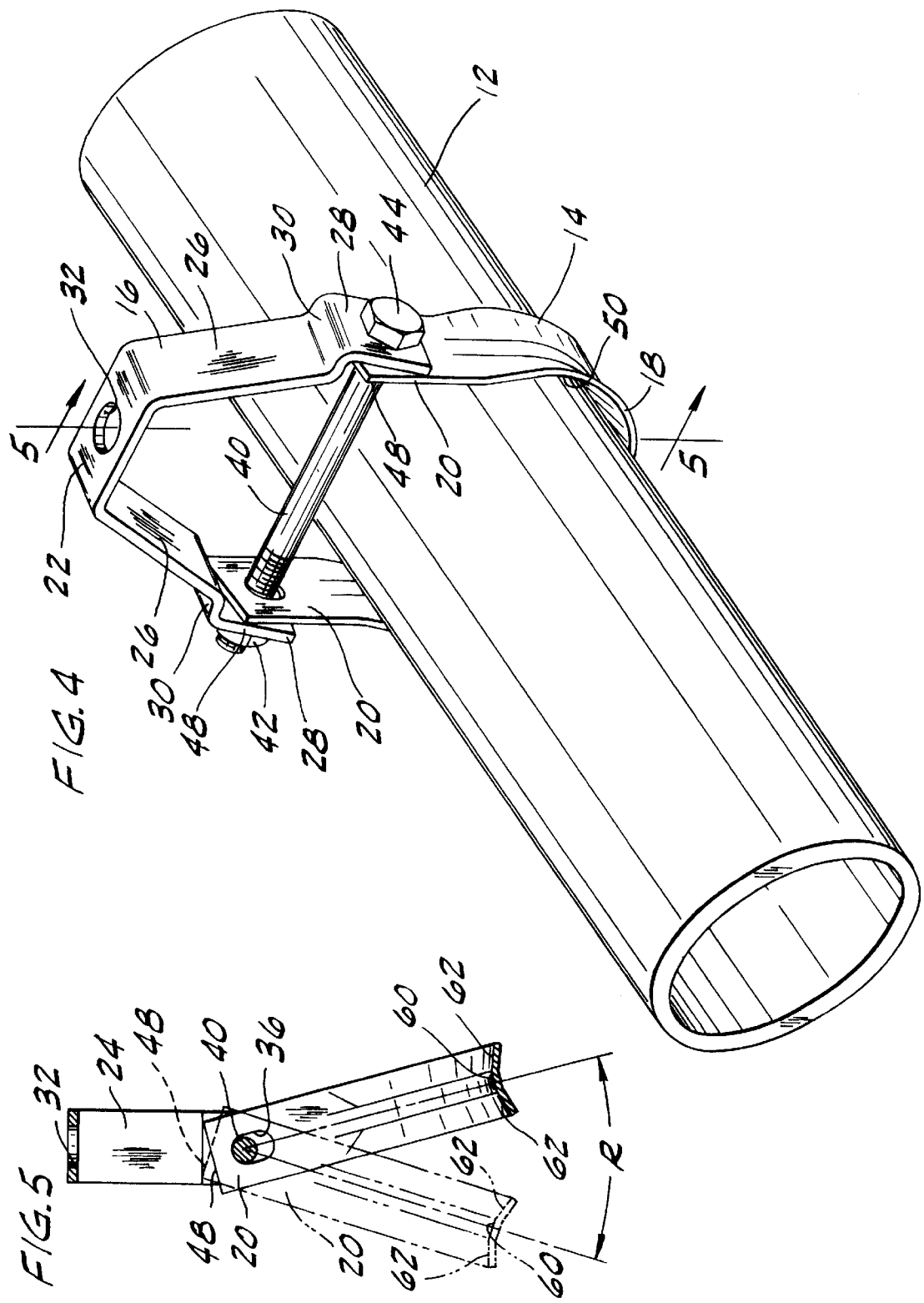

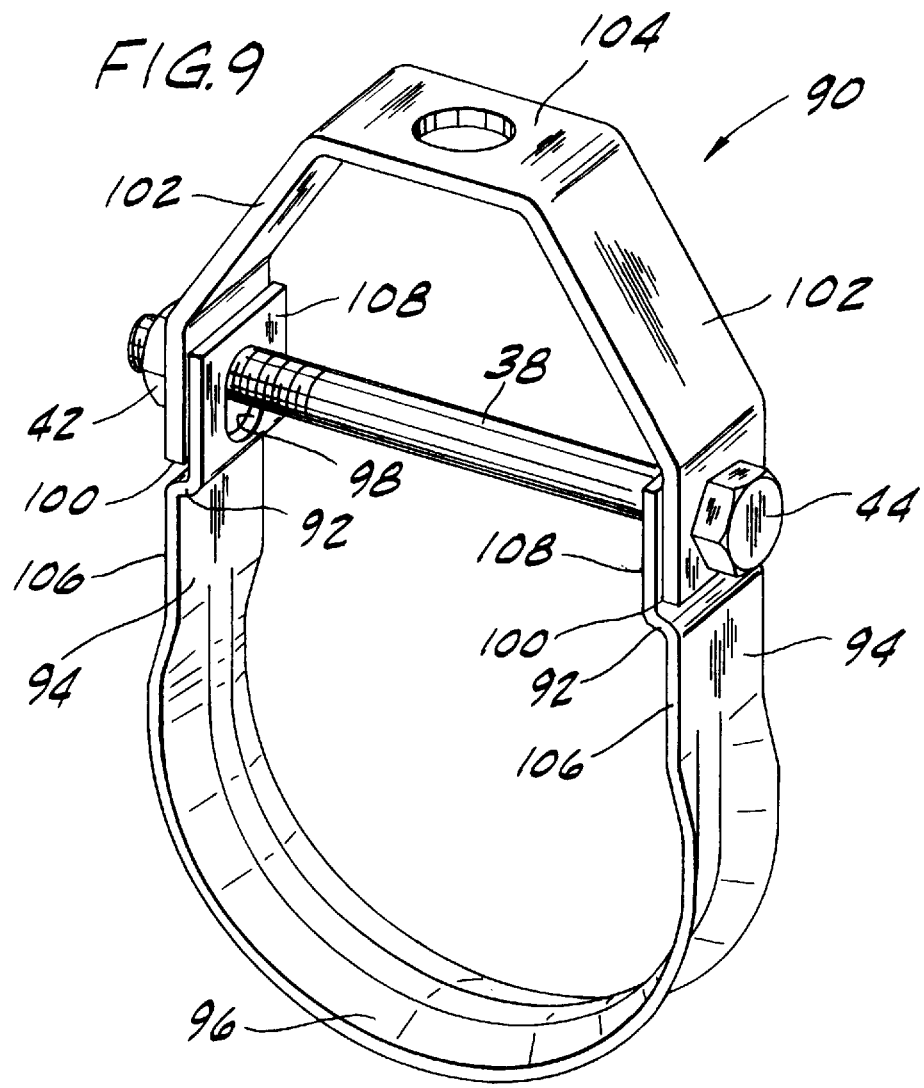

CLEVIS HANGER

BACKGROUND OF THE INVENTION

This invention relates to clevis hangers for supporting cable, conduit and pipe from a ceiling or other overhead support.

Conduit installed along ceilings and the like is often supported by a series of clevis hangers connected to support rods depending from the ceiling. Each clevis hanger typically includes a lower U-shaped hanger member for supporting the conduit and an upper hanger member for connecting the clevis hanger to the support rod. The lower and upper hanger members include arms having openings which, when horizontally aligned, receive a fastener to connect the two members together. In one method of assembling the clevis hanger and installing the conduit, the lower U-shaped hanger member is fitted onto the conduit and raised with the conduit above an installer's head to mate with the upper hanger member which is already connected to the support rod. Due to the poor lighting conditions and unfavorable position of the installer with respect to the clevis hanger, it is usually difficult for the installer to align the openings of the lower and upper hanger members so that the fastener may be inserted through the openings to connect the two members together.

In another installation method, the lower hanger member is connected to the upper hanger member and the clevis hanger assembly is connected to the support rod. The conduit is then fed through the clevis hanger. Since the lower hanger member is typically free to rotate about a longitudinal axis extending through the fastener, the conduit often causes the lower hanger member to rotate away from the conduit as the conduit contacts the lower hanger member. This is particularly a problem when a conduit is fed through the clevis hanger at an angle from a location below the clevis hanger. As the lower hanger member rotates away from its conduit supporting position, the opening through which the conduit is fed is reduced, thus making it difficult to push the conduit through the clevis hanger without manually holding the lower hanger member in its conduit supporting position. Furthermore, as the conduit is fed through the clevis hanger, rotation of the lower hanger member causes a sharp outer edge of the lower hanger member to scrape against the conduit. The scraping of the outer edge of the lower hanger member along the conduit as it is fed through the clevis hanger not only damages a conduit formed from a plastic material, it makes installation more difficult and puts additional stress on the support rod. The rotation of the lower member also makes adjustment of the clevis hanger to support a conduit at a specific height and angle difficult due to the variability in height caused by the angled position of the lower hanger member.

Moreover, since the inside surface of the lower hanger member of the clevis hanger typically conforms to the outer periphery of the conduit, condensation often builds up and is trapped between the conduit and clevis hanger which may damage the clevis hanger or conduit over time. The surface contact between the pipe and clevis hanger also makes installation more difficult due to friction between the pipe and clevis hanger, and makes it difficult for the conduit to move within the lower hanger for adjustment due to expansion and contraction of the conduit.

Furthermore, in order to reduce weight and cost of the clevis hanger, the lower hanger member is typically formed from a thin strap of metal. The thin metal strap often loses its shape over time and is easily bent and damaged due to its lack of stiffness.

Accordingly, there is presently a need for a clevis hanger which allows for easy non-visual alignment between the lower and upper hanger members to facilitate assembly of the clevis hanger, a clevis hanger which limits rotation of the lower hanger member about the fastener to facilitate feeding of the conduit through the clevis hanger, a clevis hanger with increased stiffening of the lower member to provide a rigid lightweight clevis hanger, and a clevis hanger which reduces the contact surface area between the lower hanger member and conduit to eliminate buildup of condensation, prevent damage to the conduit by an outer edge of the lower hanger member and further facilitate installation of the conduit through the clevis hanger.

SUMMARY OF THE INVENTION

Among the several objects of this invention may be noted the provision of a clevis hanger which has an alignment feature for simple alignment and assembly of lower and upper hanger members of the clevis hanger; the provision of a clevis hanger which includes a stop for limiting rotation of the lower hanger member to allow for easy insertion of a conduit through the hanger; the provision of a clevis hanger which has a ridge on an inside surface of the lower hanger member for supporting the conduit to prevent damage to the conduit by an outer edge of the lower hanger member, reduce the contact surface area between the conduit and lower hanger member to facilitate insertion of the conduit through the clevis hanger, and prevent build-up of condensation between the conduit and lower hanger member; and the provision of a clevis hanger which is economical to manufacture.

In general, a clevis hanger of the present invention is used for supporting conduit and comprises a lower U-shaped member having a pair of generally parallel arms, each having an upper end, and an upper hanger member having a pair of spaced-apart arms depending generally downward therefrom. Each arm of the upper hanger member has an upper portion, a lower portion and a lower end. The lower portions of the two arms of the upper hanger member are horizontally spaced apart such that the lower portions are located adjacent the arms of the lower hanger member. Each of the arms of the lower hanger member and each of the lower portions of the arms of the upper hanger member has an opening therein. The openings are in generally horizontal alignment with one another when the upper and lower hanger members are connected. An elongate fastener is adapted to be through the aligned openings to connect the upper and lower hanger members. The clevis hanger further includes alignment means for limiting the upward movement of the lower hanger member relative to the upper hanger member to align the openings in the arms of the upper and lower hanger members to facilitate insertion of the fastener through the openings.

In another aspect of the invention, a clevis hanger comprises a U-shaped lower hanger member having an arcuate bottom and a pair of generally parallel arms extending upwardly from the bottom and an upper hanger member having a pair of arms depending generally downward therefrom. Each arm of the upper hanger member has a lower portion. The lower portions of the two arms of the upper hanger member are spaced apart such that the lower portions are located adjacent the arms of the lower hanger member. Each of the arms of the lower hanger member and each of the lower portions of the arms of the upper hanger member has an opening therein. The openings are in generally horizontal alignment with one another when the upper and lower hanger members are connected. An elongate fastener extends through the openings for connecting the upper and lower hanger members. The arcuate bottom of the lower hanger member has, as viewed in transverse cross section, a central portion and two side margins extending laterally outwardly from the central portion such that the central portion forms a ridge on an inner surface of the arcuate bottom. The side margins are depressed relative to the central portion.

In yet another aspect of the present invention, a clevis hanger comprises a lower U-shaped member having a pair of generally parallel arms, each arm having an upper end, and an upper hanger member having a pair of spaced-apart arms depending generally downward therefrom. Each arm of the upper hanger member has an upper portion, a lower portion and a lower end. The lower portions of the two arms of the upper hanger member are horizontally spaced apart such that the lower portions are located adjacent the arms of the lower hanger member. Each of the arms of the lower hanger member and each of the lower portions of the arms of the upper hanger member has an opening therein. The openings are in generally horizontal alignment with one another when the upper and lower hanger members are connected. An elongate fastener is adapted to be inserted through the aligned openings to connect the upper and lower hanger members. The clevis hanger further includes means for limiting rotation of the lower hanger member relative to the upper hanger member. The clevis hanger is configured such that when the fastener is inserted into the aligned openings, the means for limiting rotation permits the lower hanger member to swing freely on the fastener through an arc of predetermined length, but limits swinging of the lower hanger member beyond the arc.

Other objects and features will be in part apparent and in part pointed out hereinafter.

BRIEF DESCRIPTION OF THE DRAWINGS

FIG. 4 is a perspective view of the clevis hanger of FIG. 1 showing a conduit being inserted at an angle through the clevis hanger;

FIG. 5 is a cross-sectional view of the clevis hanger of FIG. 4 taken in the plane including line 5—5 of FIG. 4 with the conduit removed and the lower hanger member shown rotated through arc R;

FIG. 9 is a perspective view of a second embodiment of a clevis hanger of the present invention.

Corresponding dereference characters indicate corresponding parts throughout the several views of the drawings.

DESCRIPTION OF PREFERRED EMBODIMENTS

Figure 1:
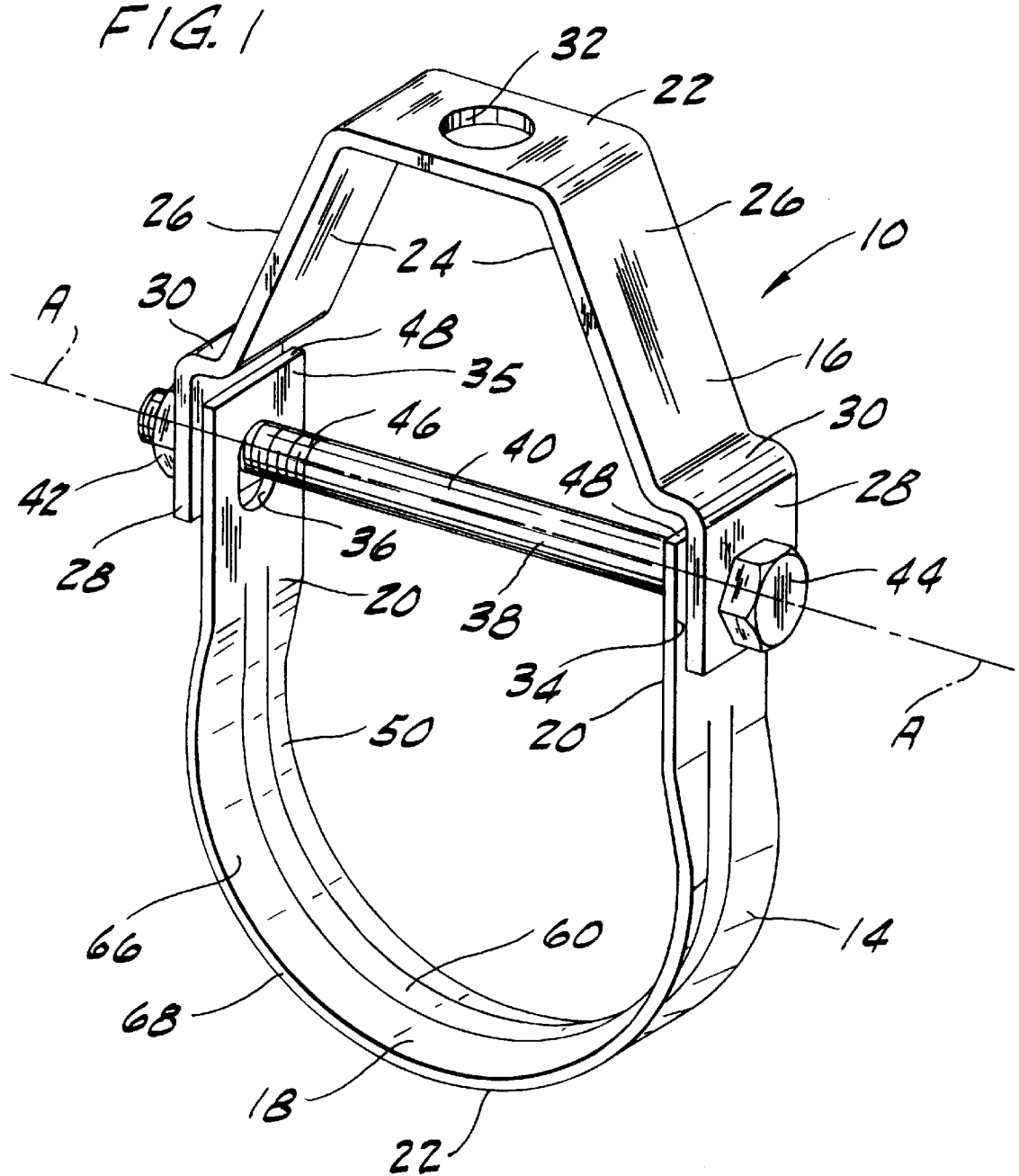
FIG. 1 is a perspective view of a clevis hanger of the present invention.

Referring now to the drawings, and first to FIG. 1, a clevis hanger is generally indicated at 10. The clevis hanger is used to support conduit 12, pipes (e.g., PVC pipes), electrical wiring and the like. The clevis hanger 10 is supported by a support rod (not shown) depending from a ceiling or other overhead support. The clevis hanger 10 includes a lower U-shaped hanger member 14 for supporting the conduit 12 and an upper hanger member 16 for connecting the clevis hanger to the support rod.

The lower U-shaped hanger member 14 has an arcuate bottom 18 which generally conforms to the outer periphery of the conduit 12 and a pair of generally parallel arms 20 extending upwardly from the arcuate bottom. As shown in FIG. 1, the bottom 18 of hanger member 14 has a middle region designated 22 located generally midway between the arms 20 for supporting the conduit 12. The upper hanger member 16 has a generally horizontal central portion 22 and a pair of spaced-apart arms 24 depending generally downward therefrom. Each arm 24 of the upper hanger member 16 has an upper portion 26, a lower portion 28 and a generally horizontal steplike portion 30 integrally connecting the upper and lower portions. The steplike portions 30 of the two arms 24 are generally coplanar with one another and extend inwardly from the lower portions 28 of the arms to the upper portions 26 of the arms. The central portion 22 of the upper hanger member 16 has an opening 32 for receiving the support rod depending from the ceiling or other overhead support. The lower and upper hanger members 14, 16 are preferably formed from steel or other suitable material. They may, for example, be made from metal straps bent to form the shapes shown in FIG. 1.

The lower portions 28 of the two arms 24 of the upper hanger member 16 are horizontally spaced apart such that the lower portions are located adjacent the arms 20 of the lower hanger member 14 in a generally overlapping relationship. The lower portions 28 of the two arms 24 of the upper hanger member 16 are located adjacent outside faces 34 of the arms 20 of the lower hanger member 14. Each of the arms 20 of the lower hanger member 14 and lower portions 28 of the arms 24 of the upper hanger member 16 has an opening 36 therein. These four openings 36 are in generally horizontal alignment with one another when the lower and upper hanger members 14, 16 are connected. An elongate fastener 38 is inserted through the aligned openings 36 to connect the lower and upper hanger members 14, 16. The fastener 38 defines a longitudinal axis A about which the lower hanger member 14 may rotate. The fastener 38 may be a bolt 40 and nut 42 as shown in FIG. 1. The bolt 40 has a head 44 at one end having a diameter larger than the openings 36 in the arms 20, 24 and a threaded shank portion 46 at its opposite end for receiving the nut 42 to retain the bolt in the openings in the arms. It is to be understood that other types of fasteners may be used including two separate fasteners without departing from the scope of this invention. The openings 36 in the arms 20 of the lower hanger member 14 are preferably sufficiently larger than the diameter of the fastener 38 to allow for vertical movement of the lower hanger member relative to the upper hanger member 16 as will be discussed further below. The openings 36 may be circular, oblong or any other suitable shape.

Figure 2:
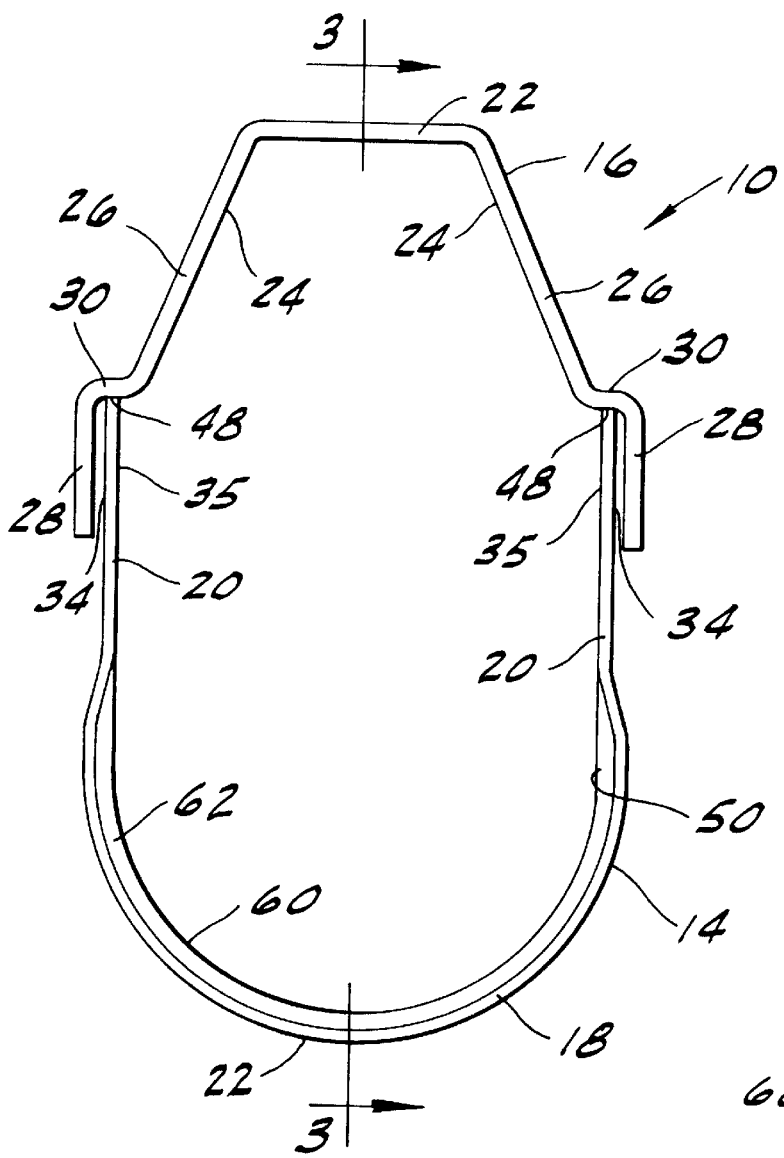
FIG. 2 is a front view of the clevis hanger of FIG. 1 with a lower hanger member engaged with stops of an upper hanger member of the clevis hanger.
Figure 3:
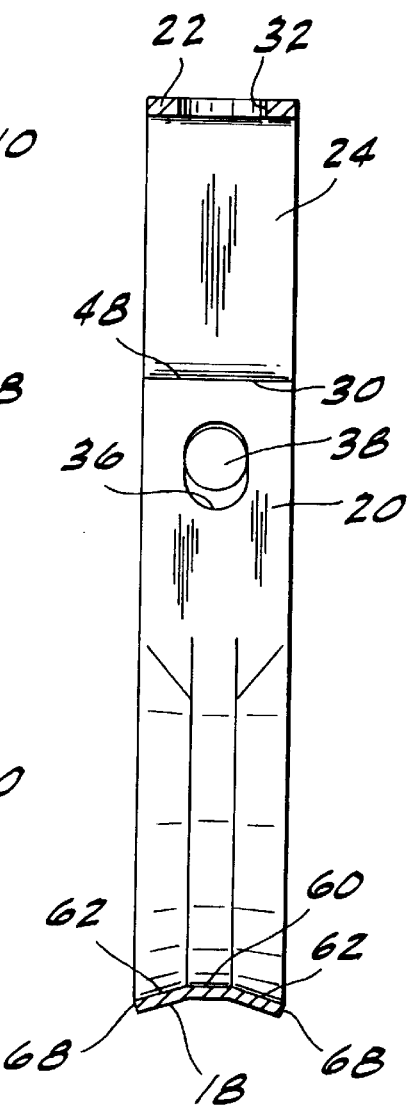
FIG. 3 is a cross-sectional view of the clevis hanger of FIG. 2 taken in the plane including line 3—3 of FIG. 2.

The clevis hanger 10 further includes alignment means for aligning the openings 36 in the arms 20, 24 of the lower and upper hanger members 14, 16 to facilitate insertion of the fastener 38 through the openings. The alignment means comprises stops formed by the steplike portions 30 of the arms 24 of the upper hanger member 16. The stops 30 are engageable by upper ends 48 of the arms 20 of the lower hanger member 14 to limit upward movement of the lower hanger member relative to the upper hanger member 16 and are positioned so that when the upper ends of the arms of the lower hanger member are in contact with the stops (FIGS. 2 and 3), the openings 36 in the arms of the lower and upper hanger members are in horizontal alignment with one another to facilitate insertion of the fastener 38 through the openings. Thus, in order to assemble the lower and upper hanger members 14, 16, the upper ends 48 of the arms 20 of the lower hanger member 14 are moved upward towards the upper hanger member 16 until the upper ends contact the stops 30. When the upper ends 48 contact the stops 30, the openings 36 in the arms 20, 24 of the lower and upper hanger members 14, 16 are in alignment and the fastener 38 may be inserted through the openings to connect the lower and upper hanger members. Thus, there is no need to visually line up the openings 36 for insertion of the fastener 38. It is to be understood that the stops 30 and arms 20, 24 of the lower and upper hanger members 14, 16 may have configurations other than those shown without departing from the scope of this invention. For example, the stops may extend laterally outwardly (instead of laterally inwardly) from the lower portions 28 of the upper hanger member 16. The lower portions 28 of the arms 24 of the upper hanger member 16 would then be located adjacent inside faces 35 of the arms 20 of the lower hanger member 14 so that the upper ends 48 of the arms of the lower hanger member contact the stops located outside the lower portions of the arms of the upper hanger member. The steplike portions forming the stops 30 may also angle downwardly from the upper portion 26 of the arms 24 of the upper hanger member 16 to the lower portions 28 of the arms rather than extend horizontally as shown in FIG. 1. The stops 30 may also be formed from tabs (not shown) punched either inwardly or outwardly from the lower portions 28 of the arms 24 of the upper hanger member 16. The stops 30 may be formed separately from the upper hanger member 16 and welded to the upper hanger member or attached by a fastening device.

The openings 36 in the arms 20 of the lower hanger member 14 are sized to permit the lower hanger member to drop down out of contact with the stops 30 to a conduit supporting position after the fastener 38 has been inserted through the openings to connect the lower and upper hanger members 14, 16 (FIG. 1). When the lower hanger member 14 is in the conduit supporting position (FIG. 4), the upper ends 48 of the arms 20 of the lower hanger member are spaced sufficiently below the stops 30 to permit the lower hanger member to swing freely on the fastener 38 through an arc R of predetermined length, but sufficiently close to the stops so that the upper ends of the arms of the lower hanger member are engageable with the stops to limit swinging of the lower hanger member beyond the arc (FIG. 5). The stops 30 thus provide means for limiting rotation of the lower hanger 14 member relative to the upper hanger member 16. The arc R through which the lower hanger member 14 may swing is preferably between 5 and 90 degrees, and more preferably about 30 degrees. The stops 30 limit the swinging motion of the lower hanger member 14 to facilitate installation of the conduit 12 through the clevis hanger 10. The arc R is limited so that when the lower hanger member 14 is in its fully rotated position, an opening 50 formed by the lower hanger member and fastener 38 is large enough to receive the conduit 12. Some swinging motion of the lower hanger member 14 is preferred so that the lower hanger member can rotate to adjust for expansion and contraction of the conduit 12 over time and allow the conduit to be installed in a position other than parallel to the ceiling. It is to be understood that the upper hanger member 16 may have only one stop 30 on one arm 24 of the upper hanger member to limit rotation of the lower hanger member 14 relative to the upper hanger member.

Figure 7A:
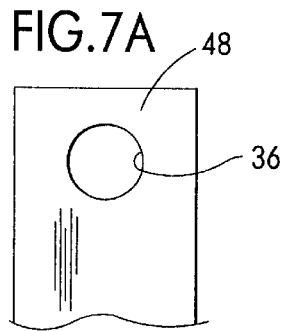
FIGS. 7A–7F are partial side views showing different upper end configurations of the lower hanger member.
Figure 7B:
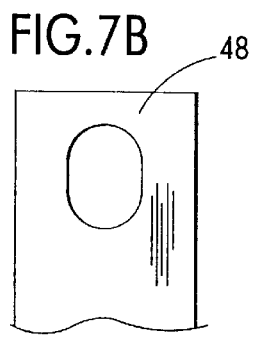
Figure 7E:
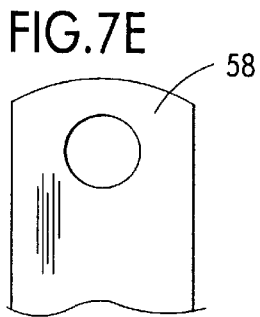
Figure 7F:
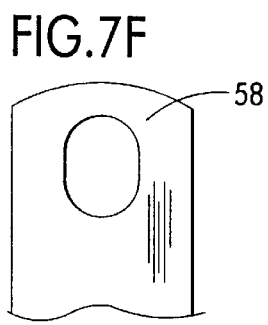

The upper ends 48 of the lower hanger member 14 may be rectangular with circular openings or oblong shaped openings as shown in FIGS. 7A and 7B, respectively, or they may have other configurations as shown in FIGS. 7C–7F. For example, the upper ends may have a truncated triangular shape 56 (FIGS. 7C and 7D), or they may have curved arcuate upper edges 58 (FIG. 7E and 7F). The rectangular upper ends 48 of the arms 20 of the lower hanger member 14 (FIGS. 7A and 7B) limit the swing of the lower hanger member through a smaller arc R than the upper ends 56 with the truncated triangular shape (FIG. 7C and 7D) or curved arcuate upper edges 58 (FIGS. 7E and 7F). It will be understood that the length of the arc R will depend on both the shape of the upper ends 48, 56, 58 and the distance between the upper ends and the stops 30. The upper ends 48 may also have configurations other than those shown without departing from the scope of this invention.

Figure 6:
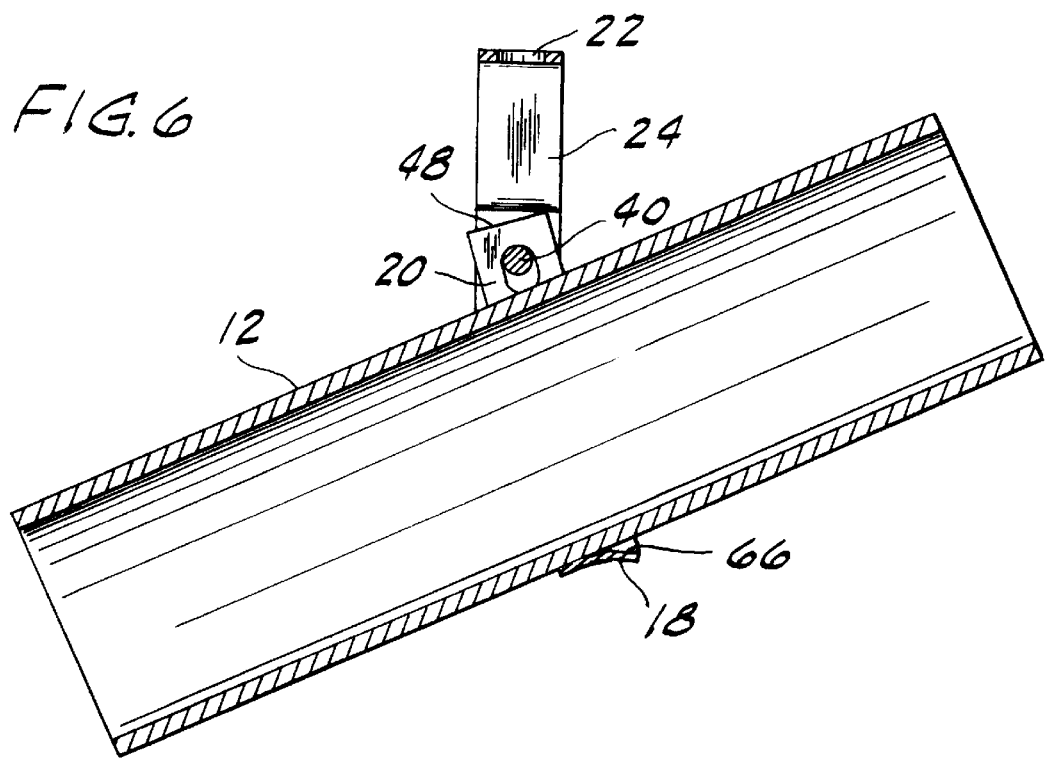
FIG. 6 is a cross-sectional view of the clevis hanger of FIG. 4 taken in the plane including line 5—5 of FIG. 4.
Figure 8A:
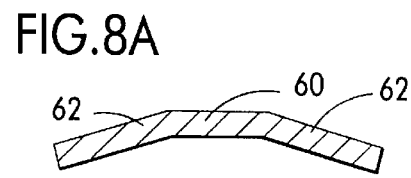
FIGS. 8A–8D are cross sectional views showing different configurations of an arcuate bottom of the lower hanger member.
Figure 7C:
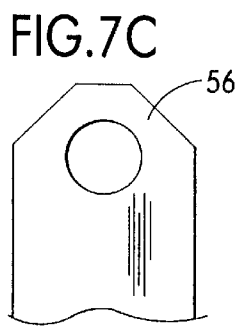
Figure 7D:
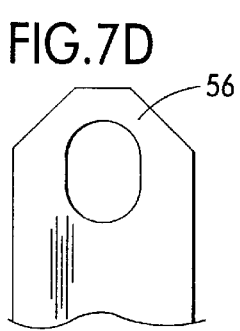

The arcuate bottom 18 of the lower hanger member 14 has, as viewed in transverse cross section (i.e., a section taken in a vertical plane perpendicular to the vertical plane containing the arms 20 of the lower hanger member 14), a central portion 60 and two side margins 62 extending laterally outwardly from the central portion such that the central portion forms a ridge on an inner surface 66 of the arcuate bottom (FIGS. 6 and 8A). The side margins 62 are depressed relative to the central portion 60.

Figure 6A:
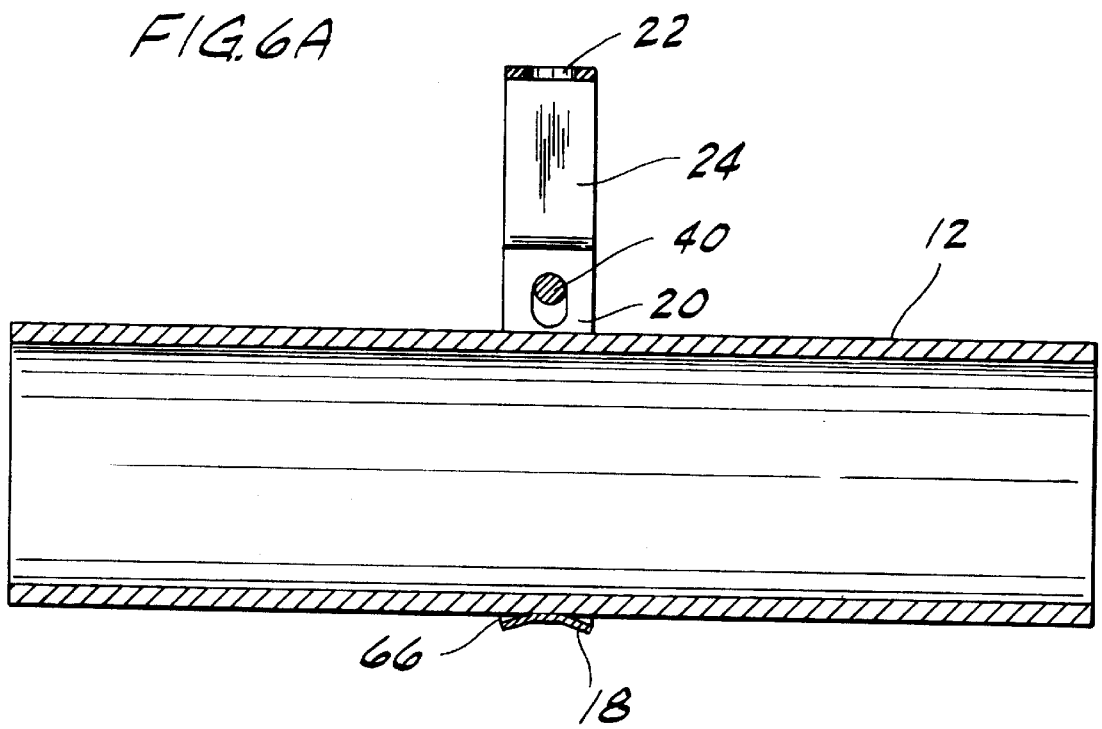
FIG. 6A is a cross-sectional view similar to FIG. 6 showing the conduit in a horizontal position.

As shown in FIG. 8A, the central portion 60 is generally planar and the side margins 62 angle outwardly and downwardly from the central portion. As shown in FIG. 6, when the conduit 12 is fed through the clevis hanger at an incline, it may be supported by one of the side margins 62 of the arcuate bottom 18. Once the conduit 12 is fed through the clevis hanger 10, the conduit rests on the central portion 60 of the lower hanger member 14 (FIG. 6A). The elevated central portion 60 of the hanger bottom 18 allows water to drain from the inner surface 66 of the lower hanger member 14 and prevents buildup of condensation between the conduit 12 and the inner surface of the lower hanger member. The central portion 60 also reduces the contact surface area between the conduit 12 and the lower hanger member 14, thus reducing the friction between the conduit and lower hanger member to facilitate the feeding of the conduit through the clevis hanger 10. The configuration of the bottom 18 of the lower hanger member 14 also reduces the likelihood of damage to the conduit 12 by a sharp outer edge 68 of the bottom. Furthermore, the ridge 60 acts as a stiffening rib so that less material is required to provide sufficient rigidity to the lower hanger member 14. In addition to imparting rigidity to the lower hanger member 14, the rib 60 prevents the lower hanger member from losing its U-shape over time so that the lower and upper hanger members 14, 16 can be disassembled and later reassembled with the arms 20 of the lower hanger member easily fitting within the lower portions 28 of the arms 24 of the upper hanger member. The rib 60 is preferably continuous along substantially the entire length of the bottom 18. It is to be understood that the rib 60 may also be segmented instead of formed as one rib extending continuously along the bottom 18.

Figure 8B:
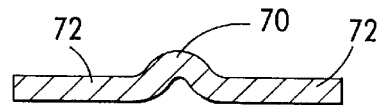
Figure 8C:
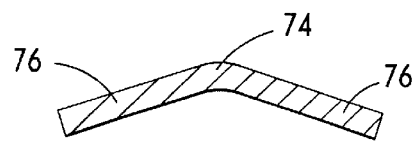
Figure 8D:
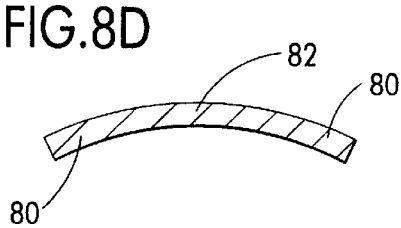

FIGS. 8B–8D illustrate alternate cross-sectional configurations of the bottom 18 of the lower hanger member 14. FIG. 8B shows the bottom as having an upwardly arched central portion 70 and two generally coplanar side margins 72 extending horizontally outwardly from the central portion. FIG. 8C shows a bottom in the shape of a shallow inverted V, including a narrow curved central portion 74 and two substantially planar side margins 76 angling downwardly and outwardly therefrom. FIG. 8D shows a generally arch shaped bottom having side margins 80 extending from central portion 82.

FIG. 9 illustrates a second embodiment of the clevis hanger, generally indicated at 90. The clevis hanger 90 is similar to the clevis hanger 10 of the first embodiment except that the alignment means, e.g., steplike stops 92, are located on arms 94 of the lower hanger member 96 below the openings 98 in the arms of the lower hanger member. These stops 92 are engageable by lower ends 100 of the arms 102 of the upper hanger member 104. The stops 92 are preferably (but not necessarily) generally horizontal and extend inwardly from lower portions 106 of the arms 94 to upper portions 108 of the arms. It is to be understood that the stops 92 and arms 94, 102 of the lower and upper hanger members 96, 104 may have configurations other than those shown without departing from the scope of this invention. For example, the stops 92 may extend laterally outwardly (instead of laterally inwardly) from the lower portions 106 of the lower hanger member 96. The stops 92 may also angle upwardly from the lower portions 106 of the arms 94 of the lower hanger member 96 to the upper portions 108 of the arms rather than extend horizontally as shown in FIG. 9. The stops 92 may also be formed from tabs (not shown) punched either inwardly or outwardly from the upper portions 108 in the arms 94 of the lower hanger member 96. The stops 92 may also be formed separately and welded or fastened to the lower hanger member 96. The clevis hanger 90 may also have only one stop formed on one arm 94 of the lower hanger member 96. The stops may also be formed on the arms of both the lower and upper hanger members, or a stop may be formed on one arm of the lower hanger member and one arm of the upper hanger member.

The clevis hanger 90 is configured such that when the fastener 38 is inserted into the aligned openings 98, the lower ends 100 of the upper hanger member 104 are spaced sufficiently above the stops 92 to permit the lower hanger member 96 to swing freely through an arc of predetermined magnitude, but sufficiently close to the stops so that the lower ends of the arms of the upper hanger member are engageable with the stops to limit swinging of the lower hanger member beyond the arc.

To assemble the clevis hanger 10 and install the conduit 12, the lower hanger member 14 may be connected to the upper hanger member 16 with the conduit in place or the lower and upper hanger members may be first assembled and the conduit fed through the clevis hanger. In the first method, an upper end of the support rod is connected to the ceiling and the upper hanger member 16 is connected to a lower end of the support rod. The lower hanger member 14 is then fitted around the conduit 12, and the conduit and lower hanger member are lifted up toward the upper hanger member 16 until the upper ends 48 of the arms 20 of the lower hanger member 14 contact the stops 30 on the upper hanger member 16. The fastener 38 is then inserted through the horizontally aligned openings 36 in the arms 20, 24 of the lower and upper hanger members 14, 16.

In the second method of assembly and installation, the lower hanger member 14 and upper hanger member 16 of the clevis hanger 10 are first assembled as described above. The clevis hanger assembly 10 is then connected to the lower end of the support rod. The conduit 12 is fed through the opening 50 in the clevis hanger 10 to a position on the central portion 60 of the arcuate bottom 18 of the lower hanger member 14.

The clevis hanger 90 may be assembled and the conduit installed by the methods described above for the clevis hanger 10. In order to align the lower and upper hanger members 96, 104, the lower hanger member is lifted up toward the upper hanger member until the lower ends 100 of the arms 102 of the upper hanger member contact the stops 92 on the lower hanger member.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A clevis hanger for supporting conduit comprising:
   a U-shaped lower hanger member having a pair of generally parallel arms, each arm having an upper end;
   an upper hanger member having a pair of spaced-apart arms depending generally downward therefrom, each arm of the upper hanger member having an upper portion, a lower portion and a lower end, the lower portions of the two arms of the upper hanger member being horizontally spaced apart such that said lower portions are located adjacent the arms of the lower hanger member;
   each of the arms of the lower hanger member and each of the lower portions of the arms of the upper hanger member having an opening therein, the openings being in generally horizontal alignment with one another when the upper and lower hanger members are connected;
   an elongate fastener adapted to be inserted through said aligned horizontal openings to connect the upper and lower hanger members; and
   alignment means for limiting the upward movement of the lower hanger member relative to the upper hanger member to align the horizontal openings in the arms of the upper and lower hanger members to facilitate insertion of the fastener through the openings.

2. A clevis hanger as set forth in claim 1 wherein said alignment means comprises stops on the arms of one of the upper and lower hanger members, said stops being so positioned that when one of the arms of the other of the upper and lower hanger members are in contact with the stops, the openings in the arms of the upper and lower hanger members are in alignment with one another.

3. A clevis hanger as set forth in claim 2 wherein said stops are on the arms of the upper hanger member above the openings in the lower portions of the arms, and wherein said stops are engageable by the upper ends of the arms of the lower hanger member.

4. A clevis hanger as set forth in claim 3 wherein the openings in the arms of the lower hanger member are sized to permit the lower hanger member to drop down out of contact with said stops to a conduit supporting position after the fastener has been inserted through the openings to connect the upper and lower hanger members.

5. A clevis hanger as set forth in claim 4 wherein when the lower hanger member is in said conduit supporting position, the upper ends of the lower hanger member are spaced sufficiently below said stops to permit the lower hanger member to swing freely on the fastener through an arc of predetermined length, but sufficiently close to the stops so that the upper ends of the arms of the lower hanger member are engageable with the stops to limit swinging of the lower hanger member beyond said arc.

6. A clevis hanger as set forth in claim 5 wherein said arc is approximately 30 degrees.

7. A clevis hanger as set forth in claim 3 wherein said stops comprise steplike portions of the arms of the upper hanger member.

8. A clevis hanger as set forth in claim 7 wherein said steplike portions integrally connect the upper and lower portions of the arms of the upper hanger member.

9. A clevis hanger as set forth in claim 8 wherein the upper hanger member comprises a generally rectangular metal strap bent to form the upper, lower and steplike portions of the arms of the upper hanger member, and wherein said steplike portions of the two arms of the upper hanger member are generally coplanar.

10. A clevis hanger as set forth in claim 3 wherein said upper ends of the arms of the lower hanger member are generally rectangular.

11. A clevis hanger as set forth in claim 3 wherein said upper ends of the arms of the lower hanger member have curved arcuate upper edges.

12. A clevis hanger as set forth in claim 2 wherein the openings in the arms of the lower hanger member are sized to permit the lower hanger member to drop down out of contact with said stops to a conduit supporting position after the fastener has been inserted through the openings to connect the upper and lower hanger members.

13. A clevis hanger as set forth in claim 2 wherein said stops are on the arms of the lower hanger member below the openings in the arms, and wherein said stops are engageable by the lower ends of the arms of the upper hanger member.

14. A clevis hanger as set forth in claim 13 wherein said stops comprise steplike portions of the arms of the lower hanger member.

15. A clevis hanger as set forth in claim 1 wherein said lower end portions of the arms of the upper hanger member are located adjacent outside faces of the arms of the lower hanger member.

16. A clevis hanger as set forth in claim 1 wherein said fastener is a bolt.

17. A clevis hanger as set forth in claim 1 wherein said upper hanger member further comprises a generally horizontal central portion connecting the arms of the upper hanger member and having an opening for receiving a support rod.

18. A clevis hanger as set forth in claim 1
wherein the U-shaped lower hanger member has an arcuate bottom and wherein the pair of generally parallel arms extend upwardly from the bottom, said arcuate bottom having a middle region generally midway between the arms for supporting said conduit;
said middle region of the arcuate bottom of the lower hanger member having, as viewed in transverse cross section, a central portion and two side margins extending laterally outwardly from the central portion such that the central portion forms a ridge on an inner surface of the arcuate bottom, said side margins being depressed relative to the central portion.

19. A clevis hanger as set forth in claim 18 wherein said central portion is generally planar and said side margins angle laterally outwardly from said central portion.

20. A clevis hanger as set forth in claim 18 wherein said central portion is upwardly arched and said side margins extend horizontally outwardly from the central portion and are generally coplanar with one another.

21. A clevis hanger as set forth in claim 18 wherein said central portion and said side margins form a shallow inverted V.

22. A clevis hanger as set forth in claim 18 wherein said central portion and said side margins form an arch.

23. A clevis hanger for supporting conduit comprising:
a U-shaped lower hanger member having a pair of generally parallel arms, each arm having an upper end;
an upper hanger member having a pair of spaced-apart arms depending generally downward therefrom, each arm of the upper hanger member having an upper portion, a lower portion and a lower end, the lower portion of the two arms of the upper hanger member being horizontally spaced apart such that said lower portions are located adjacent the arms of the lower hanger member;
each of the arms of the lower hanger member and each of the lower portions of the arms of the upper hanger member having an opening therein, the openings being in generally horizontal alignment with one another when the upper and lower hanger members are connected;
an elongate fastener adapted to be inserted through said aligned openings to connect the upper and lower hanger members; and
means for limiting rotation of the lower hanger member relative to the upper hanger member;
the clevis hanger being configured such that when the fastener is inserted into said aligned openings, the means for limiting rotation permits the lower hanger member to swing freely on the fastener through an arc of predetermined length, but limits swinging of the lower hanger member beyond said arcs
said means for limiting rotation comprising stop means on the arms of one of the upper and lower hanger members, said stop means being positioned such that the arms of the other of the upper and lower hanger members are engageable with the stop means to limit swinging of the lower hanger member beyond said arc.

24. A clevis hanger as set forth in claim 23 wherein said stop means comprises stops on the arm of the upper hanger member above the openings in the lower portions of the arms, and wherein the clevis hanger is configured such that when the fastener is inserted into said aligned openings, the upper ends of the lower hanger member are spaced sufficiently below said stops to permit the lower hanger member to swing freely, but sufficiently close to the stops so that the upper ends of the arms of the lower hanger member are engageable with the stops to limit swinging of the lower hanger member beyond said arc.

25. A clevis hanger as set forth in claim 24 wherein said arc is approximately 30 degrees.

26. A clevis hanger as set forth in claim 24 wherein said stops comprise steplike portions of the arms of the upper hanger member.

27. A clevis hanger as set forth in claim 26 wherein said steplike portions integrally connect the upper and lower portions of the arms of the upper hanger member.

28. A clevis hanger as set forth in claim 23 wherein said stop means comprises stops on the arms of the lowers hanger member below the openings in the arms of the lower hanger member, and wherein the clevis hanger is configured such that when the fastener is inserted into said aligned openings, the lower ends of the upper hanger member are spaced sufficiently above said stops to permit the lower hanger member to swing freely, but sufficiently close to the stops so that the lower ends of the arms of the upper hanger member are engageable with the stops to limit swinging of the lower hanger member beyond said arc.

29. A clevis hanger as set forth in claim 28 wherein said stops comprise steplike portions of the arms of the lower hanger member.

* * * * *

UNITED STATES PATENT AND TRADEMARK OFFICE
CERTIFICATE OF CORRECTION

PATENT NO. : 5,848,770
DATED : December 15, 1998
INVENTOR(S) : Robert D. Oliver, et al.

It is certified that error appears in the above-identified patent and that said Letters Patent is hereby corrected as shown below:

Column 10, claim 24, line 36, "on the arm" should read ---on the arms---.

Column 10, claim 28, line 54, "of the lowers hanger" should read ---of the lower hanger---.

Signed and Sealed this

Sixth Day of July, 1999

Q. TODD DICKINSON

*Attest:*

*Attesting Officer*    Acting Commissioner of Patents and Trademarks